(12) United States Patent
Hall

(10) Patent No.: US 7,607,374 B2
(45) Date of Patent: *Oct. 27, 2009

(54) TUBE MILLING HEAD

(75) Inventor: J. Randall Hall, Wadsworth, OH (US)

(73) Assignee: H&S Tool, Inc., Wadsworth, OH (US)

( * ) Notice: Subject to any disclaimer, the term of this patent is extended or adjusted under 35 U.S.C. 154(b) by 358 days.

This patent is subject to a terminal disclaimer.

(21) Appl. No.: 11/157,624

(22) Filed: Jun. 21, 2005

(65) Prior Publication Data

US 2006/0002776 A1    Jan. 5, 2006

Related U.S. Application Data

(63) Continuation of application No. 10/721,539, filed on Nov. 25, 2003, now Pat. No. 6,955,507, which is a continuation-in-part of application No. 10/657,890, filed on Sep. 9, 2003, now Pat. No. 7,143,673.

(51) Int. Cl.
*B23B 5/14* (2006.01)
*B23B 3/22* (2006.01)

(52) U.S. Cl. ............................ 82/46; 82/113; 407/33; 407/66; 407/67

(58) Field of Classification Search ............ 407/33, 407/66, 67, 70; 82/46, 113, 70.2; 409/138, 409/140; 408/82
See application file for complete search history.

(56) References Cited

U.S. PATENT DOCUMENTS 1,204,994 A    11/1916   Kendall
1,253,015 A     1/1918   Driscoll (Continued)

FOREIGN PATENT DOCUMENTS

EP    1321210    6/2003

(Continued)

OTHER PUBLICATIONS

Document No. ES 0002—Babcock Engineering Drawing of Babcock Head, No. 5259 68, 1 page, "alleged" date Aug. 30, 1996, unknown if publicly available.

(Continued)

*Primary Examiner*—Willmon Fridie
(74) *Attorney, Agent, or Firm*—Hudak, Shunk & Farine Co. LPA

(57) ABSTRACT

Tube ends such as those of boiler tube banks, are prepared utilizing any of various combinations of processes which include a step of micro-diameter tube film removal from a portion of a tube end, including an area below a beveled segment, or segment to be beveled. The micro-diameter film removal step provides the tube with an exposed, clean metal surface which is conducive to a subsequent welding or bonding operation performed on the tube. Preferably, the process is performed with a tube milling tool having interchangeable milling or cutting heads. A specialized milling head is also disclosed and, in one embodiment, is at least used to perform the micro-diameter tube film removal step. Advantageously, the tube film removal milling head also removes a weld overlay on one or both sides of a tube in one embodiment. The tube film removal milling head includes an attached blade having a planar face configuration which enables tube film removal.

22 Claims, 4 Drawing Sheets

U.S. PATENT DOCUMENTS

| | | | |
|---|---|---|---|
| 2,253,028 A | 8/1941 | Hassig | |
| 2,289,631 A | 7/1942 | Cuda et al. | |
| 2,749,809 A | 6/1956 | Anderson | |
| 2,970,843 A | 2/1961 | Bourguignon | |
| 3,007,686 A | 11/1961 | Pearson | |
| 3,051,059 A | 8/1962 | Davey | |
| 3,054,313 A | 9/1962 | Stikeleather | |
| 3,157,076 A * | 11/1964 | Arthur | 82/128 |
| 3,228,268 A | 1/1966 | Strout | |
| 3,515,029 A | 6/1970 | Gambini | |
| 3,976,388 A | 8/1976 | Webb | |
| 3,999,452 A | 12/1976 | Larsen | |
| 4,091,699 A | 5/1978 | Chaze et al. | |
| 4,192,067 A | 3/1980 | Calhoun et al. | |
| 4,266,896 A | 5/1981 | Meier et al. | |
| 4,364,290 A | 12/1982 | Astle | |
| 4,437,366 A | 3/1984 | Astle | |
| 4,449,871 A | 5/1984 | Hillestad | |
| 4,459,883 A | 7/1984 | Astle | |
| 4,486,131 A | 12/1984 | Eckle | |
| 4,498,820 A | 2/1985 | Brennen | |
| 4,601,222 A | 7/1986 | Gill | |
| 4,633,555 A | 1/1987 | Legge | |
| 4,689,920 A | 9/1987 | Geise | |
| 4,691,600 A | 9/1987 | Carlson et al. | |
| 4,718,201 A | 1/1988 | Legge | |
| 4,739,688 A | 4/1988 | Brennan et al. | |
| 4,743,149 A | 5/1988 | Geise | |
| 4,830,551 A | 5/1989 | Brennan et al. | |
| 4,872,249 A | 10/1989 | VanderPol et al. | |
| 4,889,454 A | 12/1989 | Hillestad et al. | |
| 4,958,542 A | 9/1990 | Skerrett | |
| 4,979,294 A | 12/1990 | Bowman et al. | |
| 5,033,347 A | 7/1991 | Hillestad et al. | |
| 5,044,075 A | 9/1991 | Brennan et al. | |
| 5,189,933 A | 3/1993 | Ricci | |
| 5,211,212 A | 5/1993 | Carlson et al. | |
| 5,304,018 A | 4/1994 | LaVanchy et al. | |
| 5,314,270 A * | 5/1994 | Lavancy et al. | 408/1 R |
| 5,356,248 A | 10/1994 | Hillestad | |
| 5,531,550 A | 7/1996 | Moruzzi | |
| 5,542,177 A * | 8/1996 | Hillestad | 29/890.03 |
| 5,911,548 A | 6/1999 | Deiss et al. | |
| 5,921,720 A | 7/1999 | Lemke | |
| 6,004,082 A | 12/1999 | Ruhlmann et al. | |
| 6,135,680 A | 10/2000 | Szuba et al. | |
| 6,276,244 B1 | 8/2001 | Fisher et al. | |
| 6,668,697 B2 | 12/2003 | Chen | |
| 6,739,807 B2 | 5/2004 | Robinson et al. | |
| 6,786,684 B1 | 9/2004 | Ecker | |
| 6,955,507 B2 | 10/2005 | Hall | |
| 6,957,936 B2 | 10/2005 | Kress | |
| 7,140,816 B2 | 11/2006 | Hall | |
| 7,143,673 B2 | 12/2006 | Hall | |
| 7,313,992 B2 | 1/2008 | Hall | |
| 7,360,975 B2 | 4/2008 | Hall | |
| 2004/0018064 A1 | 1/2004 | Liu | |
| 2004/0234349 A1 | 11/2004 | Ueda et al. | |
| 2005/0053432 A1 | 3/2005 | Hall | |
| 2005/0053440 A1 | 3/2005 | Hall | |

FOREIGN PATENT DOCUMENTS

| | | |
|---|---|---|
| GB | 2092934 A | 8/1982 |
| JP | 57-202930 | 12/1982 |

OTHER PUBLICATIONS

Document No. ES 0016—Babcock Construction/Engineering drawing of Head, No. 1513862, 1 pg., "alleged" date Oct. 28, 1982, unknown if publicly available.

Document Nos. ES 0020-0023—*Portable Pneumatic Pipe Bevelling Machines*, by G.B.C. Pipework Technologies, Inc., Houston, Texas, 4 pages cover page, p. 8, p. 26 and an additional unnumbered page, stated to be Edition 1993.

Document No. ES 0066—Babcock Engineering Drawing No. 1389620, 1 page, "alleged" date Aug. 19, 1987, unknown if publicly available.

Document Nos. ES 0117-0118—Specification sheets for standard and custom blades, Esco Tool, Medfield, MA, 2 pgs., "alleged" date Nov. 1, 1995.

Document No. ES 0225—Babcock Engineering Drawing No. 1328978, 1 page, "alleged" date Feb. 20, 1981, unknown if publicly available.

* cited by examiner

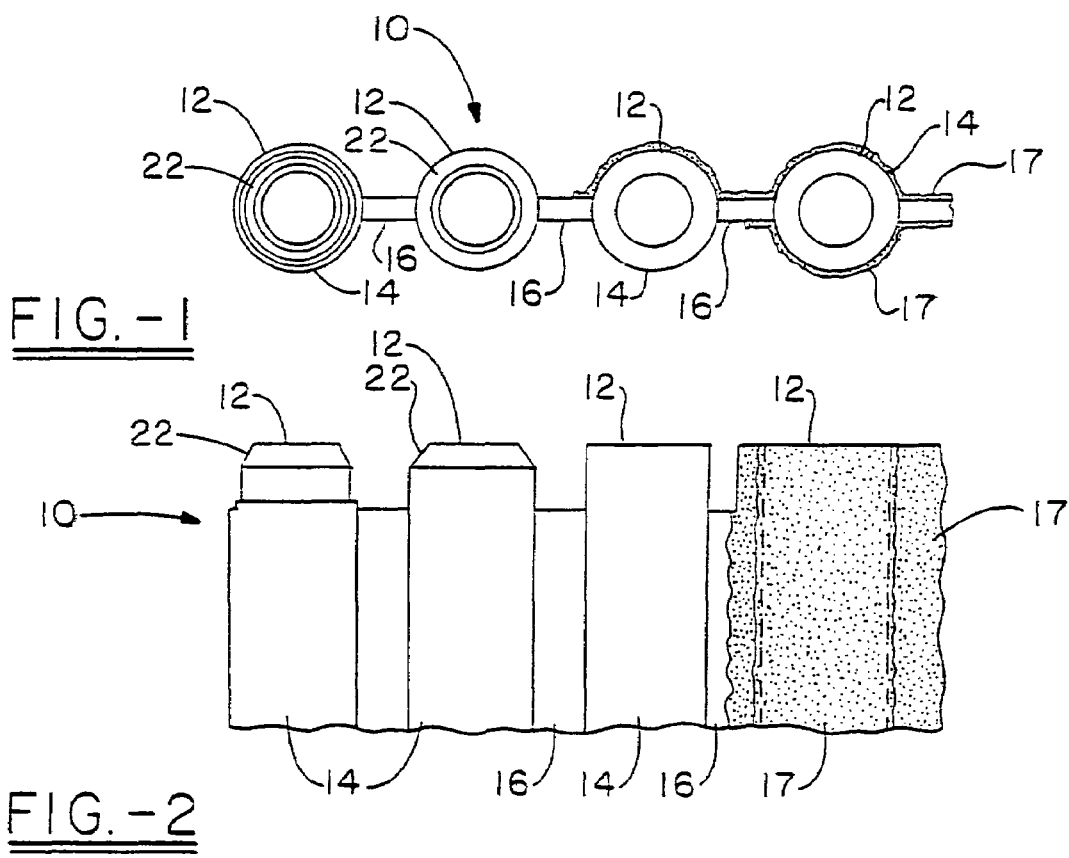
FIG.-1
FIG.-2
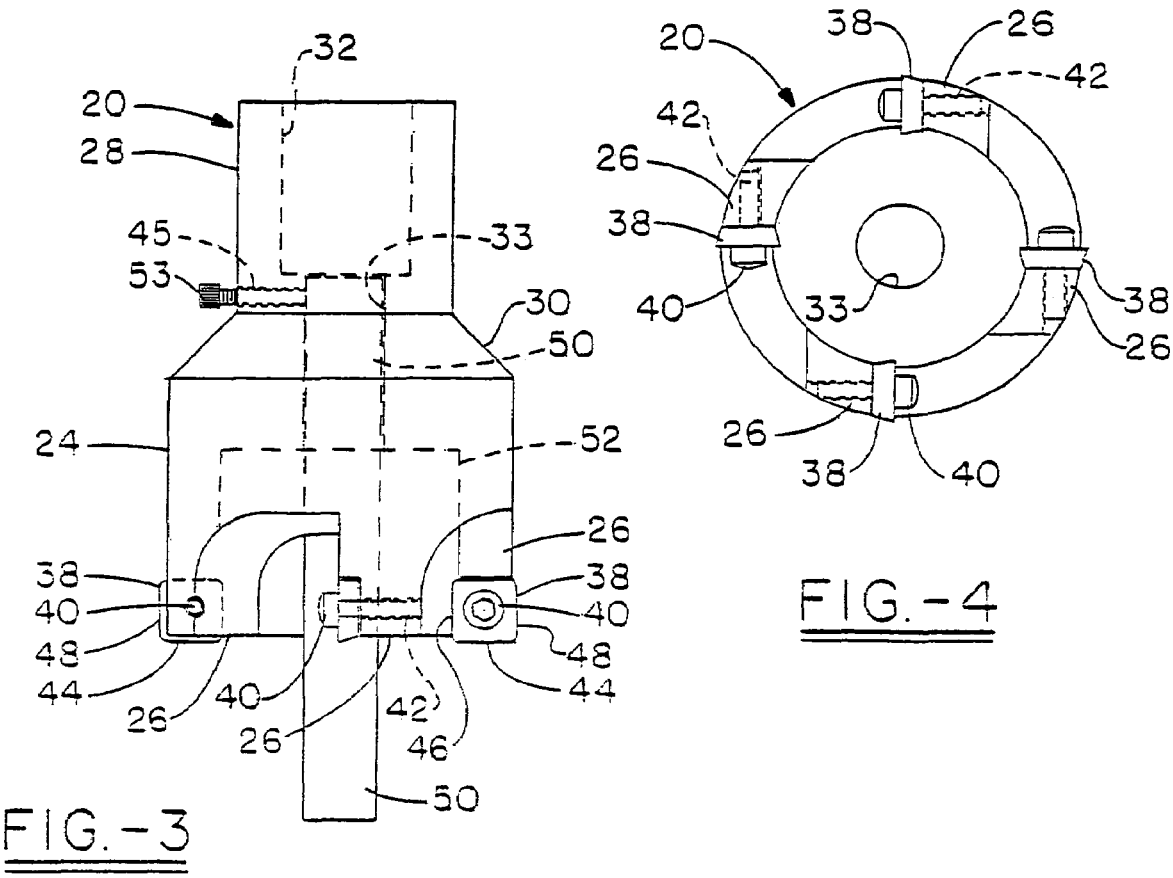
FIG.-3
FIG.-4

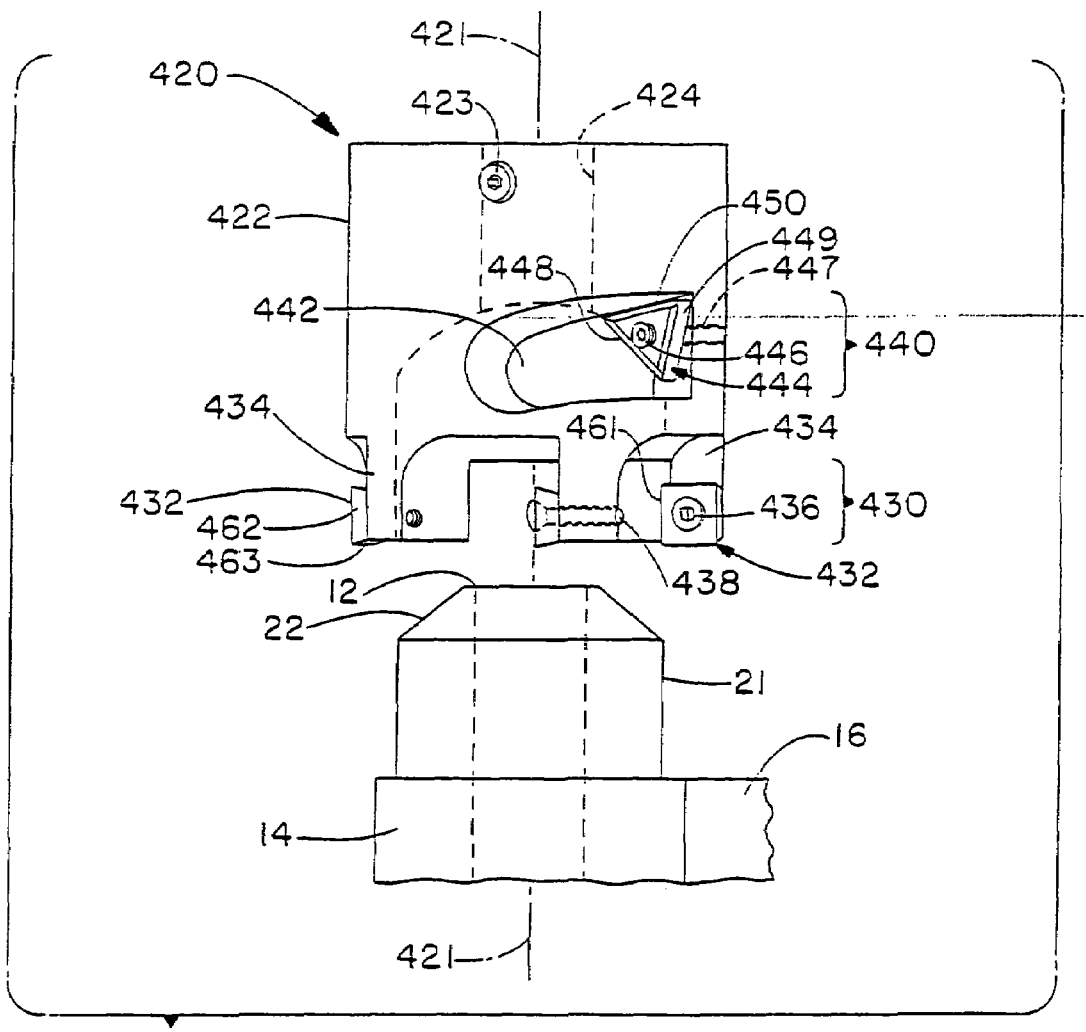
FIG.-11
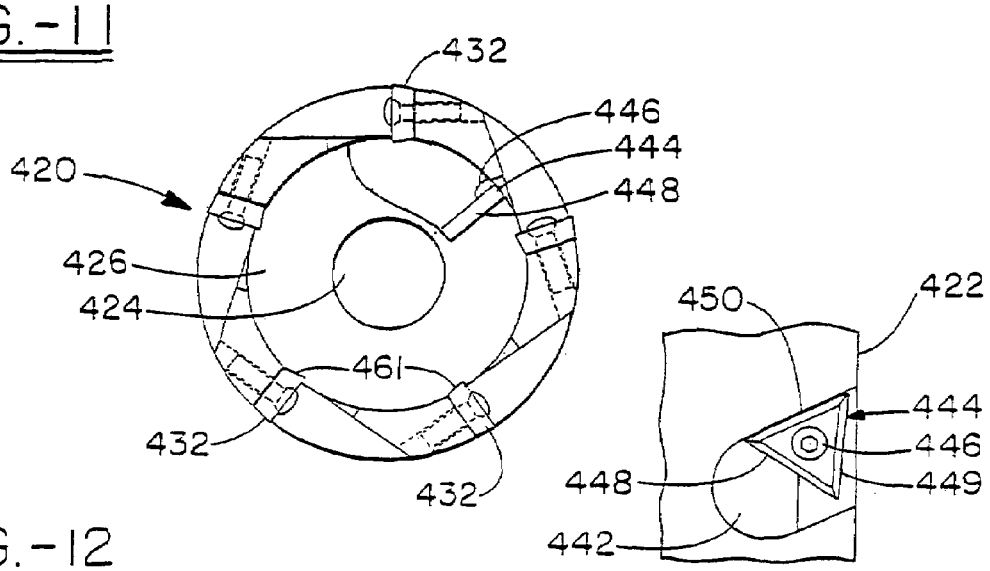
FIG.-12
FIG.-13

TUBE MILLING HEAD

CROSS REFERENCE

This is a continuation of U.S. Ser. No. 10/721,539, filed on Nov. 25, 2003, now U.S. Pat. No. 6,955,507 which is a continuation-in-part of U.S. Ser. No. 10/657,890 filed Sep. 9, 2003 now U.S. Pat. No. 7,143,673 entitled "Method For Tube End Preparation and Milling Head Therefore."

FIELD OF THE INVENTION

Tube ends such as those of boiler tube banks, are prepared utilizing any of various combinations of processes which include a step comprising micro-diameter tube film removal from a portion of a tube end in an area or tube segment to be beveled, and optionally in an area adjacent a segment to be beveled. The micro-diameter film removal step provides the tube with an exposed, clean metal surface which is conducive to a subsequent welding or bonding operation performed on the tube. Preferably, the process is performed with a tube milling tool having interchangeable milling or cutting heads. A specialized milling head is also disclosed and, in one embodiment, is at least used to perform the micro-diameter tube film removal step. Advantageously, the tube film removal milling head also removes a weld overlay on one or both sides of a tube in one embodiment. The tube film removal milling head includes an attached blade having a planar face configuration and attachment means which enables tube film removal. In a further embodiment, a tube milling head is disclosed which is adapted to perform outer diameter tube film removal as well as a beveling operation on the tube end.

BACKGROUND OF THE INVENTION

Power generating or other plants circulate fluids, such as water or steam, through tubes or banks of tubes. The fluid is often heated and used, for example, to drive turbines which generate electricity.

The tubes are generally arranged in large panels or banks of parallel tubes which are connected together with a metal membrane or web continuously interposed between each pair of adjacent tubes in the bank to form a tube wall. The tubes generally have an outer diameter which can range from about 1 inch up to about 3 inches, with a wall thickness which can be up to about 0.5 inch. The web or membrane connecting adjacent tubes to each other generally has a thickness about equal to the wall thickness of the tubes, with the width of the webbing generally ranging from about 0.25 inch to about 0.75 inch. The webs or membranes are generally welded to the outer walls of adjacent tubes to form the tube banks. In some cases a weld overlay comprising a metal or alloy is present on portions of the tube bank in an effort to prevent corrosion or deterioration. The weld overlay is present on both sides of a tube bank in some embodiments. On account of deterioration due to corrosion and the like, the tubes occasionally require replacement. Ordinarily, repair of damaged or worn tubing involves cutting and removal of relatively large sections of the tube banks, and replacement with a new panel of tubes. The bank sections are generally replaced in large rectangular sections typically having sizes ranging from a few feet to 10, 20, 100 or even 200 feet in length.

The sections of tube banks which are to be replaced are generally cut out using a power saw or a cutting torch. A method and apparatus for cutting out a section of boiler tube wall is illustrated and described in U.S. Pat. No. 5,033,347, herein fully incorporated by reference.

After the damaged or worn section of tube wall which is to be replaced has been cut out and removed, it is necessary to properly prepare the tube ends exposed by removal of the old section before positioning the new tube bank section in the tube wall opening. Proper preparation of the exposed tube ends of the existing boiler tube wall requires chamfering or beveling of the exposed tube ends to facilitate a good weld between the new tube wall section and the existing boiler tube wall. More specifically, the adjoining tube ends of the existing tube wall and those of the new or replacement section of tube wall should be provided with a frustoconical bevel so that when the adjoining tube ends are placed in alignment, a circumferential groove is formed to receive molten metal from the welding rod. The replacement section of tube wall is usually fabricated and prepared for welding off-site before the damaged or worn section of existing tube wall is removed. The exposed tube ends of the existing tube wall, however, must be prepared for welding on-site, often in a confined space. It is highly desirable that all work performed on the existing tube wall be conducted as quickly and efficiently as possible so as to minimize the period during which the steam generator is taken out of service for repair. Accordingly, preparation of the exposed tube ends of the existing tube wall for welding is generally accomplished using portable hand-held milling tools such as those disclosed in U.S. Pat. Nos. 4,449,871 and 4,889,454, herein fully incorporated by reference.

To facilitate rapid and efficient chamfering or beveling of the exposed tube ends of the existing tube wall using conventional milling tools, and to provide ample space between vertically adjacent tubes for welding around the entire circumference of the tube ends, it is highly desirable and generally necessary to remove a portion of the membrane between each pair of exposed tube ends of the existing tube wall. Typically, it is desirable to remove the membrane between adjacent tube ends, which are exposed by removal of the damaged wall section, from the horizontally cut edge of the existing boiler tube wall to a depth which is at least equal to the depth of the frustoconical bevel which is to be milled at the tube end. Typically, membrane material is removed from the horizontally cut edge between two adjacent tubes to a depth of about 3/8 inch, about 3/4 inch, or about 1 inch or more from the cut edge.

Heretofore, membrane removal utilizing rotary milling tools on an existing tube of a tube wall has been limited to a cutting sweep equal to the outer radius of a tube. Prior art membrane removal heads are not capable of performing tube cleanup and/or weld overlay removal due to milling head blade configuration or design. The prior art membrane removal heads seize, stutter and/or stop cutting when exposed to weld overlay or tube material. After the membrane material and/or welding overlay material removal, a frustoconical bevel is milled on the tube around the entire circumference thereof. Afterwards, a second tube with a corresponding bevel is matched with the first beveled tube and the tubes are welded together by molten metal or solder placed around the joined tubes, especially at the circumferential groove formed by the adjoined beveled tube ends. It has been found that beveled tubes joined in this prior manner without diameter cleanup or film removal often have weaknesses at the weld area, occasionally due to pitting, which causes air pockets or lack of weld strength. It would be beneficial to form a strong durable weld between joined tubes having beveled or chamfered ends.

SUMMARY OF INVENTION

The present invention relates to methods for repair of tubes, especially those used in boiler tube banks. The methods include a tube cleanup step of removing a small or microdiameter portion or film thickness substantially around the entire circumference of a tube end with a rotary milling device or power tool having a specialized tube film removal milling head. The tube film is removed preferably at least in an area to be beveled, or also in a longitudinal area adjacent an area to be beveled. Advantageously, the film removal milling head is also capable of removing any weld overlay from the surface of a tube. The tube outer circumference film removal step removes a predetermined radial thickness or annulus from the circumference of the outer diameter of the tube. Preferably, the radial film removal provides a substantially bare metal surface. The film removal step provides a tube surface free of rust, scale, etc., and contributes to a stronger weld between adjacent tubes.

In one embodiment, the method includes the usual step of cutting a worn or damaged section from an existing boiler tube wall to provide an opening in the tube wall having upper and lower horizontal edges transverse to the longitudinal direction of the vertical tubes comprising the tube wall. In accordance with the principles of the invention, the membrane material, if present between adjacent tubes of the boiler tube wall, is removed in the immediate vicinity of the exposed tube ends along the horizontal edges cut into the boiler tube wall by means of a power tool having a rotary milling head which is specially adapted for this purpose. The milling head generally includes a mounting portion at one of its axial ends for attaching it to an arbor or shaft of a rotary power tool, and a plurality of membrane cutting blades generally located at the opposite or distal end of the milling head. The milling head includes an arbor adapted to be inserted into an exposed tube end of an existing boiler tube wall from which a worn or damaged section has been removed. The arbor positions and stabilizes the milling head to prevent movement or jerking of the tool in a direction lateral to the longitudinal direction of the tubes during the milling operation. For membrane removal, each of the plurality of angularly disposed cutting blades has a cutting edge radially displaced from the axis of rotation of the membrane milling head to define an annular cutting sweep having an inner radius which is greater than the nominal outer radius of a tube of the tube wall. The radial thickness (i.e. the difference between the inner and outer circumferences along a line passing through the axis or center of the annular cutting sweep) of the cutting sweep is typically from about ⅜ inch to about ½ inch to allow sufficient clearance for subsequent beveling and welding around the tube ends. The cutting sweep of the blades thereby provides for adequate removal of membrane material from between pairs of adjacent tubes of the tube wall in the vicinity of the tube ends without any risk of damage to, or milling of, the tube wall.

An annular recess radially disposed between the arbor and the cutting sweep of the radially disposed blades accommodates and receives a tube end of the tube wall during the milling operation. The depth of the recess is at least equal to the depth of the frustoconical bevel which is to be milled at each of the tube ends. During the milling operation, after the arbor is inserted into one of the tube ends and after the drive means for the power tool is actuated, the tool and attached milling head are urged toward the tube end to gradually mill a desired amount of membrane material from the area immediately adjacent the tube end. The membrane milling operation is then repeated for each of the exposed tube ends to facilitate beveling of the tube ends and to provide ample space between adjacent tubes for welding a new tube bank section to the existing tube wall. The membrane is removed to a suitable depth wherein the tube cleanup can subsequently be performed on a predetermined length of the tube measured from the tube end.

In a further step in one embodiment of the invention, a tube beveling step is performed, either before and/or after a tube cleanup or film removal step. Preferably, the beveling step is performed after the tube cleanup step. The beveling step utilizes a separate milling head attachable to the rotary milling device. As disclosed in U.S. Pat. No. 5,542,177, a milling head which is capable of both membrane removal and beveling of a tube is utilized in some embodiments. The bevel cutting blades, as known to the art, are angled to mill the exposed tube end to form a frustoconical bevel thereon.

It is therefore an object of the invention to provide a method including a tube film removal step preferably on an outer portion of a tube, which is useful to prepare or clean a tube for a subsequent welding operation. In one embodiment, the tube film removal cleanup step is performed simultaneously with a weld overlay removal and/or membrane removal step utilizing the same milling head. In a further embodiment, the novel film removal milling head is utilized to remove only weld overlay in addition to any membrane present, without removing substantially any of the tube outer diameter. The tube film removal step provides a beneficial bonding surface without substantially weakening the tube.

A further object of the invention is to provide a set of milling heads which perform the functions of membrane removal, weld overlay removal, tube end beveling, or a combination thereof, in addition to a tube film removal operation, utilizing the same rotary milling device or power tool. The set of interchangeable milling heads utilizable for tube preparation, useable in conjunction with a single milling device, enables a user to be efficient and thus save downtime as well as expense.

It is yet another object of the present invention to provide a milling head having blades configured to perform tube film removal, and at least one additional blade or cutting-surface configured to perform a beveling operation on a tube end. In addition, the milling head is adapted to remove any membrane and/or weld overlay present on the tube to a predetermined depth. The milling head allows for precision milling of a tube end wherein the tube surface is prepared for a subsequent welding operation. The milling head capable of performing multiple operations simultaneously enables a user to efficiently complete tube preparation.

BRIEF DESCRIPTION OF THE DRAWINGS

The preferred embodiment of the invention, illustrative of the best mode which applicants have contemplated, is set forth in the following description and is shown in the drawings and is particularly and distinctly pointed out and set forth in the appended claims.

FIG. 1 is a top plan view of a tube wall showing tube ends which have been exposed by removal of a section of the tube wall.

FIG. 2 is a front elevation view of the tube wall of FIG. 1.

FIG. 3 is a side view of a membrane milling head.

FIG. 4 is a bottom view of the membrane milling head shown in FIG. 3.

FIG. 11 is a side view of a tube film removal and beveling milling head located above a tube milled therewith.

FIG. 12 is a bottom view of the milling head of FIG. 11.

FIG. 13 is a partial side view of the milling head of FIG. 11 in the area of the bevel blade.

DETAILED DESCRIPTION OF THE INVENTION

Figure 5:
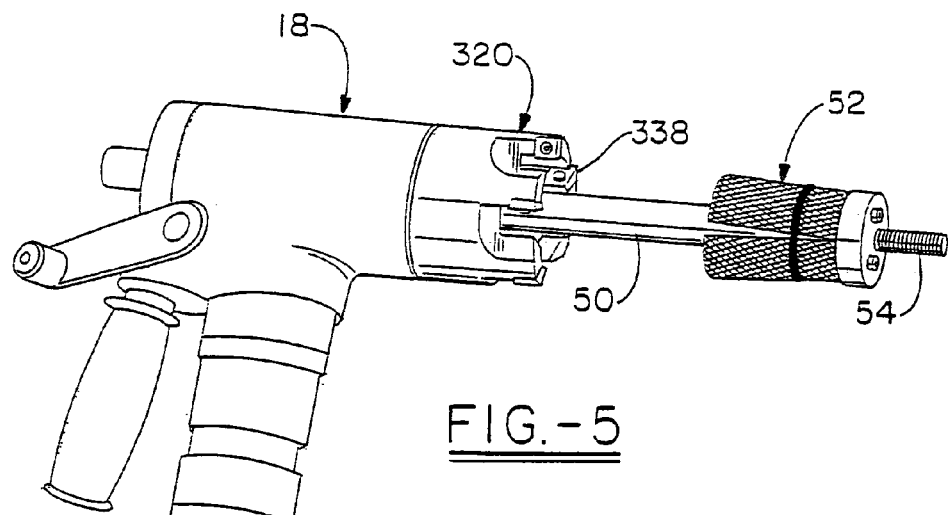
FIG. 5 is a perspective view of a milling tool having a tube film removal, membrane removal, or weld overlay removal, or a combination thereof milling head attached thereto.

This description of preferred embodiments is to be read in connection with the accompanying drawings, which are part of the entire written description of this invention. In the description, corresponding reference numbers are used throughout to identify the same or functionally similar elements. Relative terms such as "horizontal," "vertical," "up," "down," "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and are not intended to require a particular orientation unless specifically stated as such. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship.

There is shown in FIGS. 1 and 2 a portion of a boiler tube wall 10 from which a section has been cut out to expose tube ends 12. The boiler tube wall 10 is comprised of a row of parallel, typically vertically oriented tubes 14, each of which is continuously connected to an adjacent tube by a web or membrane 16. The tubes 14 and membranes 16 are generally formed separately of metal or alloy such as steel and then welded together. Repair of boiler tube walls generally involves cutting out a section of the tube wall which is worn or damaged, chamfering or beveling the tube ends which have been exposed by removal of the worn or damaged section of tube wall, and welding a new or replacement section of tube wall in place of the damaged section which has been removed. The damaged section of tube wall is usually removed by making two horizontally spaced cuts transverse to the longitudinal direction of the tubes 14 and two vertically spaced cuts, which together with the horizontal cuts define a rectangular section which is to be replaced. Before a new or replacement section of the wall can be installed, it is necessary to prepare the tube ends for welding by first removing membrane material from between the tube ends, beveling the tube ends, and also performing a tube film removal or diameter cleanup step extending a predetermined distance below a beveled portion, or portion to be beveled.

In some embodiments, a tube will include a weld overlay 17, either on one or both sides of a tube wall as shown in FIG. 1. The weld overlay is typically a metal coating, such as a pure metal, but more typically an alloy material such as inconel or other alloy which are well known to the art and to the literature, applied to the tube wall to protect against tube corrosion and/or wear. The weld overlay 17 is of varying thickness as it is generally not precisely applied. Accordingly, the weld overlay must be removed in some cases to prepare the tube ends for welding, even though difficult to remove.

Figure 6A:
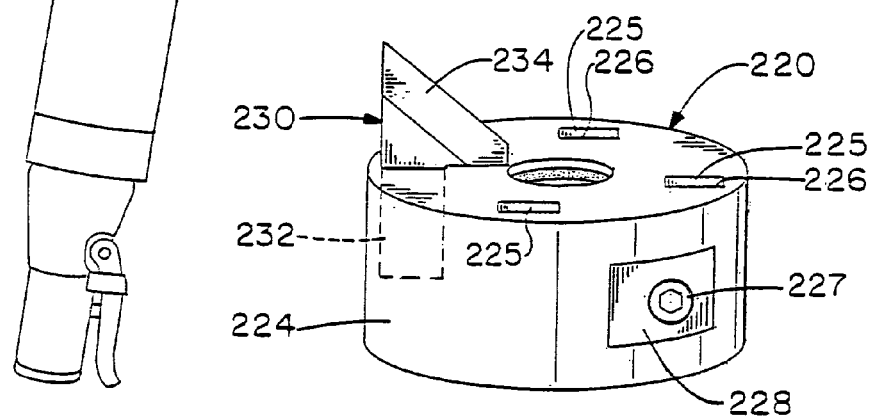
FIG. 6 is a side perspective view of a bevel milling head.
Figure 6B:
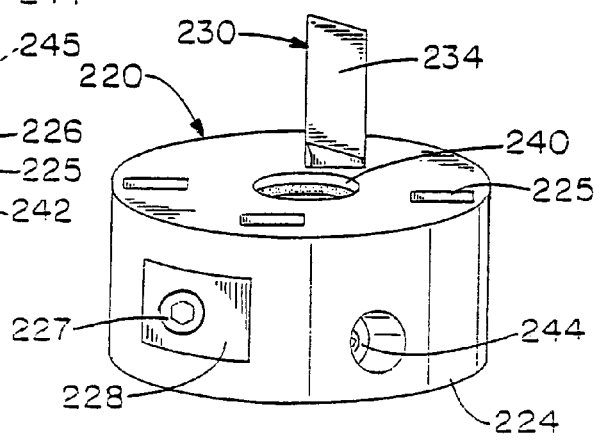
Figure 8:
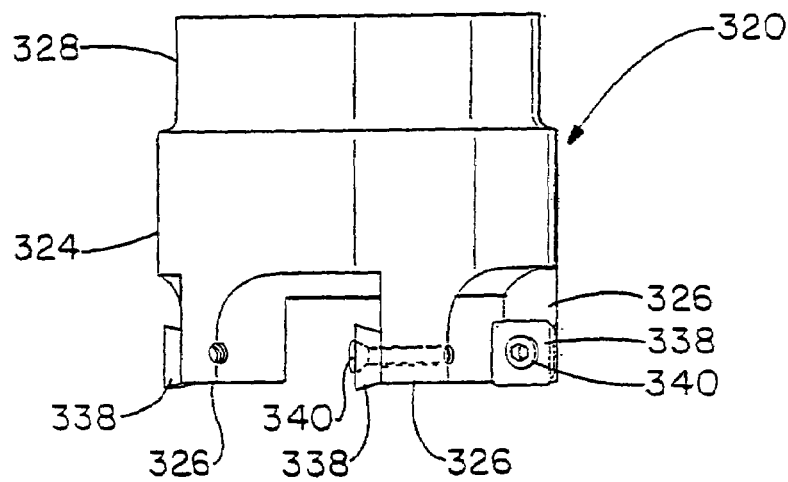
FIG. 8 is a side view of one embodiment of a tube film diameter removal milling head.

In one embodiment, the tube ends are prepared utilizing a rotary milling device or power tool 18, as shown in FIG. 5, which is preferably capable of utilizing interchangeable milling heads 20, 220, and 320 as shown in FIGS. 3, 6, and 8. Rotary milling devices are well known in the art and are commercially available from sources such as H&S Tool of Wadsworth, Ohio. Examples include, but are not limited to, Model MB, Model MS, Model B, Model MT, and Model MFT. Rotary milling devices are generally electrically or pneumatically powered.

In one embodiment, the membrane cutting rotary milling head 20 (FIGS. 3 and 4) of the invention is used to remove membrane material from between tubes. The head 20 has a generally cylindrical body 24 with a plurality of axially extending radial cutting blade supports 26 at one end and a reduced diameter coaxial cylindrically shaped tool mounting portion 28 at the other end, with an intervening frustoconical section 30 connecting the body 24 with the mounting portion 28. The mounting portion has a coaxial cylindrical bore 32 for removably receiving an arbor of the power tool 18. In one embodiment, the cylindrical bore 32 preferably includes a key slot which matingly engages a key on the tool gearing to lock the rotary milling head 20 to the tool. The milling head 20 also preferably includes a bore 33 through which a center shaft or arbor 50 is adapted to extend. The mounting portion 28 of the rotary milling head 20 is provided with a plurality of radial threaded bores which receive hexagonal socket screws which are used to removably secure the milling head to the power tool 18. Of course, various other means for mounting the milling head 20 to an output shaft of a rotary tool are possible, such as a threaded bore on the milling head mounting portion for screwing the milling head to a threaded output shaft of a rotary tool, or any of various conventional tool chucks or other means for mounting a tool piece to the output shaft of a rotary power tool.

A cutting blade 38 is removably secured to each of the cutting blade supports 26 by means of a hexagonal socket screw 40 received in a threaded bore 42 provided in each of the cutting blade supports 26. The cutting blades 38 are preferably generally square-shaped and have at least three cutting edges 44, 46 and 48, with cutting edge 44 being generally perpendicular to the rotational axis of the milling head 20, and the other two cutting edges 46,48 being parallel to the rotational axis of the milling head with the space there between being coextensive with the length of the cutting edge 44 and defining the cutting sweep of the blades 38. The inner radius of the annular cutting sweep is preferably greater than the outer radius of the tube of the tube wall to be milled or the greatest radial distance of the weld overlay, if present, measured from a center point or longitudinal axis of the tube, and the outer radius of the cutting sweep is equal to the sum of the radius of tube of the tube wall or overlay outer radius plus from about 50 to 100 percent of the width of the membrane material between adjacent tubes.

More preferably, the square cutting blade 38 can be provided with cutting edges, 44, 46, and 48, plus a fourth cutting edge opposite cutting edge 44. This allows for extended use of the blade 38. For example, if one of the edges becomes chipped, it would be possible to loosen the screw 40, rotate the blade 38 so that the damaged edge is facing the blade support and is no longer used as a cutting edge, and then retighten screw 40.

In accordance with a preferred embodiment of the invention, cutting edges 44, 46, and 48 preferably have a positive rake to provide for the fastest possible cutting speed. However, blades having a neutral rake or a negative rake can also be used and have certain other advantages. For example, negative rake blades wear better, but require a longer cutting time. Blades having neutral rake cutting edges (i.e., flat cutting edges) wear and cut at a rate intermediate between blades having positive and negative rake cutting edges. Neutral rake blades have the additional advantage of being reversible, i.e., the blade can be rotated about an axis normal to the cutting edge thereby providing for extended use.

Other blade shapes, such as triangular-shaped blades, can be used but are less desirable. Likewise, it is not necessary that one of the cutting edges of each of the blades be perpendicular to the rotational axis of the milling head 20. However, square blades arranged with one of the cutting edges 44 being perpendicular to the rotational axis of the milling head are highly preferred because they provide the greatest cutting efficiency and lowest potential for damage and wear of the blades. It has been generally found that more blades provide for better cutting efficiency and reduced blade damage and wear. However, it becomes increasingly difficult to machine milling heads with more than four or five blade supports and to change blades when there are more than four or five blade supports. Accordingly, the milling head 20 can preferably have about four or five blade supports 26 which are angularly disposed in a symmetrical fashion around the circumferential axis of the milling head. The cutting blades 38 can be made of any suitably hard material, such as tungsten carbide, customarily used for cutting or milling steel and other metals or alloys.

In a preferred embodiment, the rotary milling tool includes an arbor 50 extending outward from the cutting end of a milling head to guide and stabilize the rotary milling tool during the milling operation. Arbors and stabilization means are well known in the art. One example of an arbor 50 having a securing collet 52 attached thereto is illustrated in FIG. 5. The arbor 50 is inserted into a tube end opening before the milling operation and is preferably aligned coaxially with the rotational axis of the milling head. The arbor 50 is preferably removably secured within the tube utilizing a securing device such as collet 52. In one embodiment, the collet comprises three segments held together by a plate, screws and an o-ring, forming a single assembly. The collet is attached to the arbor 50 of the milling tool 18 by a threaded rod 54 passing through the arbor 50. Mating tapers on the collet and arbor 50 allow the collet to be drawn-up on the arbor 50 by rotating the threaded rod 54, thereby expanding the collet until it contacts and locks into the inside diameter of the tube. The collet 52 and arbor 50 remain stationary in the tube while the milling tool is engaged to and the milling head rotates about the shaft while performing its machining operation. In operation, the rotary milling tool is advanced along the arbor towards and into the tube being milled, or away therefrom to perform the desired milling, i.e., material removal operation on the membrane or tube end, etc. The arbor and any associated securing device such as a collet 52 is removed from the tube once the desired tube milling operation has been completed.

Figure 7:
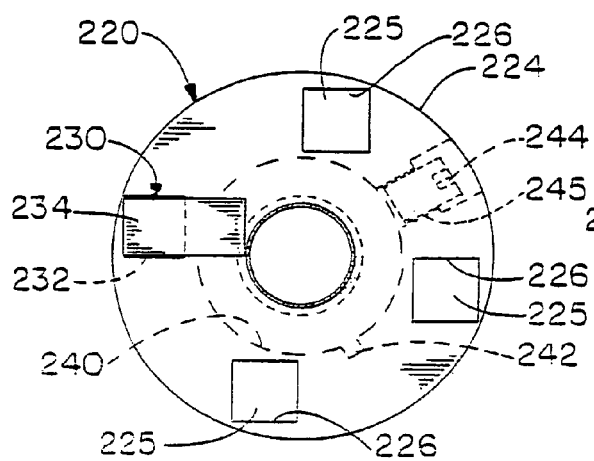
FIG. 7 is a bottom view of the bevel milling head shown in FIG. 6.

A second milling head, bevel head 220 of the invention is shown in FIGS. 6 and 7. The bevel milling head 220 is capable of being used to form a frustoconical bevel 22 on the end of the tube 14 in a tube bank 10. The bevel milling head 220 has a generally cylindrical body 224 with a plurality of openings 225, such as the squared shaped recesses shown which define the cutting blade support 226. Cutting blade 230 has a blade securing portion 232 which fits in opening 225 of body 224 and is bounded by cutting blade support 226 and secured therein by affixing element such as set screw 227. Opening 228 is appropriately sized to enable a tool such as a hexdriver or the like to be used to attach the blade 230 to the blade support.

The bevel milling head 220 includes a coaxial cylindrical bore 240 removably receiving a rotary gear or output shaft of the rotary milling device. The cylindrical bore 240 preferably includes a key slot 242 which matingly engages a key on the gear to lock the bevel milling head 220 to the rotary portion of the tool. The bevel milling head 220 can be further secured to the tool utilizing a fixing element such as set screw 244 which travels in threaded bore 245. The method of securing illustrated can be substituted with various other means for mounting the milling head as known in the art. Other securing mechanisms including providing the cylindrical bore 240 with internal threads which cooperate with a threaded output shaft on the rotary milling tool, as well as various other conventional tool chucks or means for mounting a tool piece to an output shaft of a rotary power tool.

The bevel cutting blade 230 secured to the cutting blade support 226 by means of the threaded fastener such as set screw 227 received in threaded bore 229 has an angled cutting edge 234 which is generally disposed in an angular relationship to bore 240 in the arbor of the rotary milling device. The cutting edge 234 of beveling bade 230 is arranged at an appropriate angle for providing the desired frustoconical bevel. The angle of the cutting edge 234 with the rotational axis of the milling tool is generally from about 30° to about 60°, and more preferably from about 30° to about 45°. The one or more beveled blades are axially located such that the bevel cutting blades define an annular cutting sweep capable of beveling a tube from the inner diameter to the outer diameter thereof. Bevel milling head 220 connected to the rotary milling tool is utilized in the manner similar as milling head 20. At the onset of the milling operation, the bevel milling head is advanced toward the tube end until the cutting edges 234 of the beveling milling head come into contact with the tube end. The rotary milling tool 18 is preferably temporarily connected or secured to the tube to be beveled using a collet or other securing device as known in the art and described herein. The bevel cutting edge 234 is advanced towards the tube until the desired bevel has been placed or cut into the tube.

Figure 9:
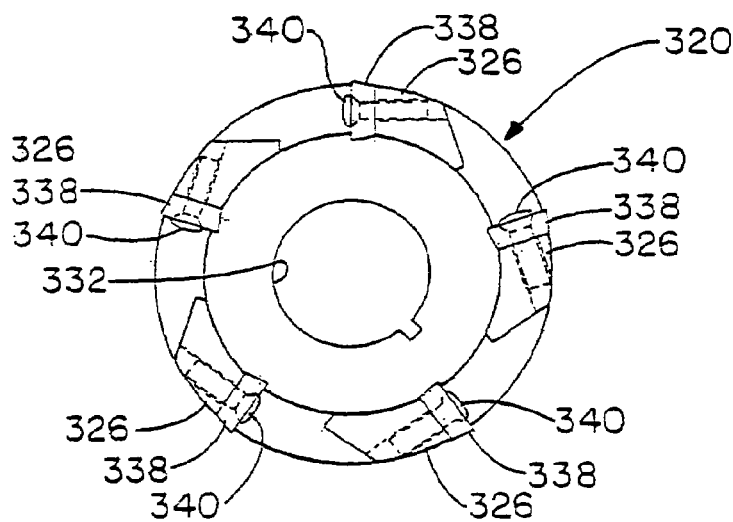
FIG. 9 is a bottom view of the milling head of FIG. 8.

A preferred diameter tube film removal milling head 320 is shown in FIGS. 5, 8 and 9 and is used to prepare a tube end for a subsequent welding operation. The diameter tube film removal step is performed preferably before, or after the tube end has been beveled such as by using the bevel milling head 220. The diameter tube film removal step cuts, grinds, or otherwise removes a film or thin annulus from the outer surface of the tube, preferably substantially completely or completely around the circumference thereof. That is, a portion of the tube outer diameter is removed, in addition to any weld overlay material and/or membrane material remaining on or surrounding the tube in the area where the diameter cleanup step is performed.

The diameter cleanup milling head 320 has a configuration or design which allows the blades thereof to mill a portion of a tube, as well as any weld overlay and/or membrane that is present on one or more sides of the tube. The blade has a cutting face which is self-cleaning and provides for continuous cutting of surfaces, especially continuous or semi-continuous surfaces such as, but not limited to, tube circumference, weld overlay and membrane. The self-cleaning ability of the milling head substantially prevents the head from seizing, catching, and/or stopping during operation and sheds chips or shavings away from the blade cutting surfaces preferably allowing continuous, uninterrupted cutting and rotation.

The tube film removal, such as with milling head 320, and optionally weld overlay removal and/or membrane removal is performed to a predetermined depth measured from a tube end generally from about 0.25 to about 0.75 inch, desirably to about 1 inch, and preferably to about 1.5 inches or more. The tube film removal step removes an outer radial portion of the tube in a range generally in an amount from about 2% up to about 20%, or about 25%, desirably up to about 15%, and preferably up to about 5% or about 10% of the total tube radial thickness (annulus), measured from the inner radius to the outer radius of the tube in a radial direction from the center point or longitudinal axis of the tube. The tube film removal step exposes a clean, bare-metal surface on the outer portion of the tube in the cleanup area. Rust, scale, or the like is removed during cleaning. The milled tube surface provides a strong bonding area for a subsequent welding operation.

As shown in FIG. 8, the preferred multi-purpose tube film removal milling head 320 includes a plurality of axially extending radial cutting blade supports 326 at one end and a tool mounting portion 328 at the other end with body 324 there between. The mounting portion 328 has a cylindrical bore 332 for removably receiving rotary gearing of the rotary milling tool 18. In one embodiment, the cylindrical bore 332 includes a key slot which matingly engages a key on the tool gearing to lock the diameter cleanup milling head 320 to the tool rotary gearing. Various other means for mounting the head as described hereinabove or known to the art can alternatively be utilized.

A cutting blade 338 is removably secured to each of the cutting blade supports 326 preferably by means of a low profile securing element 340 such as a screw or fastener received in the threaded bore 354 for each of the cutting blades supports 326.

Figure 10:
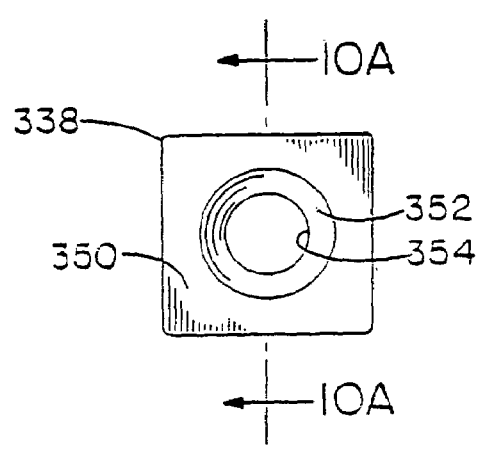
FIG. 10 is a front elevation view of a film removal blade.
Figure 10A:
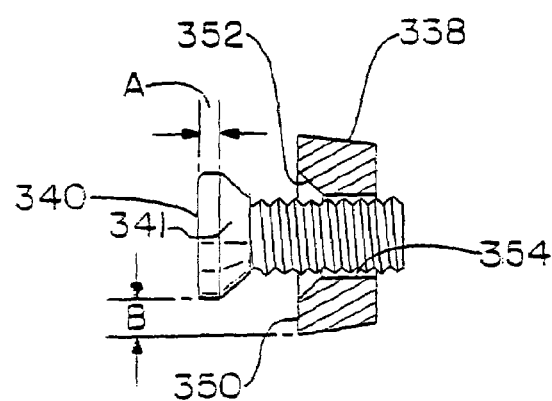
FIG. 10A is a cross section view of FIG. 10 through line 10A.

In one embodiment illustrated in FIGS. 10 and 10A, the blade 338 includes a face surface 350 having a countersink or recess 352 surrounding bore 354 through which the securing element 340 connects blade 338 to a portion of the milling head, i.e., blade support 326. In a preferred embodiment which advantageously provides the ability to cut away and remove tube films, weld overlay, or membrane, or a combination thereof, the low profile securing element 340 has a portion, such as a screw head, end portion, or the like, which extends a distance A away or out from the face surface which is less than or about equal to a second distance B measured from an outer, lower edge of securing element 340 to the bottom or lower surface cutting edge 344 as shown in FIG. 10A. Distance A when compared to distance B is generally less than about 100%, desirably less than about 95%, and preferably less than about 90%. In one further preferred embodiment, the blade recess 352 is dimensioned so that the attachment element 340 in a seated position provides the face surface 350 with a flat face. That is, the top of the head of securing element 340 is flush mounted or recess mounted on face surface 350.

As shown in FIG. 10, the cutting blade 338 is preferably generally square shaped and has at least three cutting edges 344, 346, 348, with lower cutting edge 344 being generally perpendicular to the rotational axis of the milling head 320, and the other two cutting edges 346 and 348 being parallel to the rotational axis of the milling head with the space therebetween being coextensive with the length of the cutting edge 344 and defining the cutting sweep of the blades 338. The inner radius of the annular cutting sweep is such that a predetermined amount of the outer radial portion of the tube is removed, within the above stated ranges. As noted hereinabove, the cutting edges of the blades have either positive, neutral, or negative rakes. Alternatively, the blade for the diameter cleanup milling head can be formed in other shapes as described hereinabove with respect to blade 38.

The milling heads 20, 220, and 320 of the present invention are generally used with any of various power tools having a rotating shaft. The tool motor can be electrically, hydraulically or pneumatically driven, with air driven motors being generally preferred. It has been found that the speed rotation of the milling head, such as from about 55 to about 6,000 rpm and more preferably from about 80 to about 150 rpm is highly desirable to achieve efficient cutting and reduced wear and damage to the blades and milling head. In operation, the milling tool is fitted with a desired milling head and utilized to perform a milling operation on a tube according to the purpose or design of the milling head.

In a preferred embodiment, a membrane milling head 20 is utilized to remove a membrane connecting one tube to a second tube. The membrane removal operation is performed to a predetermined depth. Afterwards, a tube film removal milling head 320 is attached to the rotary milling tool and utilized to remove a predetermined amount of tube film from the outer diameter of the tube, as well as any weld overlay and/or membrane material present. The tube film removal milling step is performed to a predetermined depth which preferably extends below an area to be beveled. In a further step, a bevel milling head 220 is attached to the rotary tool and a bevel is cut into the tube end before a second tube end is connected thereto such as by welding. In further embodiments, the tube film removal step can be performed after the tube beveling step. In yet a further embodiment, the tube film removal milling head can be used to remove membrane, weld overlay, or tube film, or a combination thereof. It is an important benefit of the present invention that a single milling tool can utilize a number of interchangeable milling heads to prepare a tube end for a subsequent operation such as welding.

In yet another embodiment of the present invention, a milling head 420 is shown in FIGS. 11 and 12. The milling head 420 is preferably utilized on a rotary milling tool, such as milling tool 18 described herein, and contains a first milling portion 430 and a second milling portion 440, independent and spaced from the first portion. The milling head is capable of tube film removal and bevel cutting the tube end utilizing the first and second milling portions respectively. Weld overlay and/or membrane, when present on the tube, is also removed by milling head 420, with the first milling portion from the outer diameter or circumference of the tube.

The milling head 420 is formed having a generally cylindrical body and includes a tool mounting portion 422 with a bore 424 for detachably receiving gearing or an output shaft of a rotary milling tool 18. In a preferred embodiment, the bore 424 includes a key slot which matingly engages a key on the rotary tool to lock milling head 420 to the milling tool 18 to provide for rotation. A set screw 423 is utilized to secure the milling head to the milling tool 18 in some embodiments.

Alternative means known to those of ordinary skill in the art can also be used to secure the milling head 420 to milling tool 18.

The first milling portion 430 is generally located on the milling head 420 at a distal end opposite tool mounting portion 422. The first milling portion 430 preferably is configured as described hereinabove with respect to the cutting blades 330 and associated structure, i.e., blade supports 326, securing element 340 and so forth, as shown in FIGS. 5, 8, and 9. Thus, first milling portion 430 includes one or more cuffing blades 432 each detachably secured to a cutting blade support 434 formed in the body of milling head 420. A securing element 436 having a low profile connection is received in bore 438 in order to secure the cuffing blade to the milling head.

In a preferred embodiment, the securing element connects the cutting blade 432 to milling head 420 which allows tube film removal, weld overlay removal, or membrane removal, or a combination thereof without substantial binding or stalling of the rotary milling tool. The securing element 436 has a portion such as a head, end portion, or the like which extends a distance A away or out of the face surface of the blade which is less than or about equal to a second distance B measured from an outer, lower edge of the securing element to the bottom or lower surface cutting edge 463 of blade 432. FIG. 10A illustrates the respective distances A and B. Distance A when compared to distance B is generally less than about 100 percent, desirably less than about 95 percent, and preferably less than about 90 percent.

In a further embodiment, blade 432 includes a recessed portion which allows the securing element 436 to be attached in a seated position without substantially protruding from the face surface of the blade, thus the connected blade has a flat face. The top of the head of securing element 436 can be flush-mounted or recess-mounted on the face of blade 432.

Cutting blade 432 is generally square-shaped and has at least three cutting edges 461, 462, and 463, with lower cutting edge 463 being generally perpendicular to the rotational axis 421 of milling head 420 and the other two cutting edges 462 and 461 being parallel to the rotational axis of the milling head with the space therebetween being coextensive with the length of the cutting edge 463 and defining the cutting sweep of blade 432. The inner radius of the annular cutting sweep is such that a predetermined amount of the outer radial portion of the tube is removed, within the ranges stated above describing tube film removal. As described hereinabove, alternative blade shapes and/or designs can be utilized.

The second milling portion 440 is adapted to perform a beveling operation on a tube end 12 and impart a beveled edge 22 thereto as illustrated in FIG. 11. The second milling portion 440 is located on the milling head 420 intermediate the first milling portion 430 and the tool mounting portion 422.

Milling head 420 includes at least one orifice 442 which is an opening in the head body between the hollow center or inner portion and the outer surface of the milling head 420. The orifice 442 is generally any size or shape and is at least large enough to facilitate the connection of bevel blade 444 to milling head 420 utilizing securing element 446 received in bore 447. In a preferred embodiment, either one, two, or three bevel blades each with corresponding orifices are utilized. The number of bevel blades is generally determined by the size of the milling head, where larger diameter milling heads can accommodate a greater number of bevel blades. When the bevel blade 444 is connected to milling head 420 only a relatively small portion or space of orifice 442 is occupied thereby. Advantageously during use shavings, chips, or flakes generated by the milling operation thereon can exit the milling head 420 through orifice 442. At least one bevel blade 444 is connected to milling head 420 so that cutting edge 448 extends inward into annular recess 426 as shown in FIG. 12. The blade 444 is preferably arranged along a radial plane extending from the central axis 421 of the milling head 420 as shown in FIG. 12.

Cutting edge 448 of bevel blade 444 is arranged at a predetermined angle in relation to milling tool rotational axis 421 in order to provide a tube end with a desired frustoconical bevel angle. The cutting edge 448 is fixed at an angle of about 20° to about 60, desirably about 30° to about 45°, and preferably about 37.5° in relation to the rotational axis 421 of the milling head 420. The second milling portion 440 bevel blades 444 are generally positioned radially equal to and inwardly of the first milling portion 430 cutting blades 432 radial inner edge. The annular cutting sweep of the at least one bevel blade 444 is generally concentric with and radially inward of the cutting sweep of the tube film removal blades 432.

The bevel blade 444 is securely connected to a wall of orifice 442 which is preferably vertically oriented and parallel to the longitudinal central rotational axis 421 of the milling head 420, i.e., a line through the first milling portion and the tool mounting portion central axes as shown in FIG. 11. In a preferred embodiment, the wall face is a plane radial to the central axis 421 of the milling head. A preferred embodiment of a bevel blade 444 is illustrated in FIG. 13. Bevel blade 444 is substantially triangular and includes three cutting edges 448, 449 and 450. Of course, the bevel blade can have other shapes such as a diamond or other geometric shape and is not limited to only the triangular embodiment illustrated. As shown in FIG. 11, only one cutting edge 448 is utilized to bevel a tube end, while the remaining cutting edges are unused. One cutting edge 450 abuts an upper wall of orifice 442 and braces the bevel blade against the body of the milling head 420 substantially preventing movement of the blade 444 during the milling operation.

The bevel blades 444 can have a neutral, positive or negative rake, with a positive rake being preferred. Advantageously, once the active cutting edge 448 becomes worn or the like, the bevel blade 444 can be removed, rotated, and reconnected, thereby presenting a fresh cutting edge such as 449 or 450. Each bevel blade 444 can be utilized multiple times before needing replaced or resharpened. In one embodiment, the bevel blade bore 447 has a countersunk orifice for attachment of a securing element, or a low profile securing element is utilized, or a combination thereof.

In a further embodiment, the bevel blade 444 utilized is a chip breaker bevel blade as shown in FIG. 13 which produces an even, smooth beveled finish on a tube end. The chip breaker bevel blade has a tapered cutting edge similar to a typical knife blade. The tapered edge progresses from a thicker portion of the blade and ends in a relatively thin, sharp point which provides a clean finish to the tube end to be beveled. The chip breaker 66 can be made by grinding, removing or building up a portion of a blade surface in the area of the cutting edge to form the tapered edge.

The second milling portion 440 bevel blade 444 is spaced a predetermined distance from first milling portion 430 and tube film removal blades 432 in order to prepare a tube having desired characteristics. The lowermost portion of active cutting edge 448 of bevel blade is located a distance from the lower cutting edge 451 of tube film removal blade 432 generally from about 0.25 inches (0.63 cm) to about 1.50 inches (3.81 cm) or about 2.0 inches (5.08 cm), desirably from about 0.75 inches (1.91 cm) to about 1.35 inches (3.43 cm), and preferably from about 1 inch (2.54 cm) to about 1.25 inches (3.18 cm).

In operation, the milling head 420 is attached through tool mounting portion 422 to rotary milling tool 18. The rotary milling tool 18 is preferably temporarily connected or secured to the tube utilizing a collet such as 52 shown in FIG. 5 which is connected to shaft 50. The milling head 420 is advanced towards the tube, wherein the first milling portion blades 432 contact and subsequently mill the predetermined outer circumference of the tube. The milling head 420 is further advanced along the tube as the milling operation is performed. Any membrane and/or weld overlay present on the surface of the tube is also removed within the cutting sweep of blades 432. As the milling head is advanced along the tube, the second milling portion 440 bevel blade 444 contacts tube end 12 and mills a desired bevel into the tube. After the desired milling operation has been performed, the rotary milling tool is disconnected from the tube leaving the tube having a beveled end and a section where tube film has been removed for a predetermined distance below the beveled end as illustrated in FIG. 11.

In accordance with the patent statutes, the best mode and preferred embodiment have been set forth, the scope of the invention is not limited thereto, but rather by the scope of the attached claims.

What is claimed is:

1. A milling head for a rotary milling tool, comprising:
   a substantially cylindrical body having an annular recess, said body adapted to be connected to a rotary milling tool,
   a first milling portion, adapted to remove a portion of an outer diameter of a tube, located substantially at one end of the body and having one or more cutting blades connected a predetermined radial distance from a rotational axis of the body to the body by a securing element, wherein the securing element includes a head which extends out from a face surface of said blade a first distance which is less than or equal to a second distance measured from a lower edge of the securing element head to a lower cutting edge of the blade, each said cutting blade having one or more cutting edges including the lower cutting edge, said one or more cutting edges defining an annular cutting sweep having an inner radius and an outer radius wherein the outer radius is adapted to be greater than an outer diameter of the tube, said cutting sweep adapted to remove from about 2% to about 25% of an outer radial thickness of the tube and any weld overlay and membrane present on the tube within the annular cutting sweep; and
   a second milling portion spaced from said first milling portion on the body and having at least one bevel cutting blade having an active cutting edge extending into the recess adapted for forming a bevel on the tube.

2. A milling head according to claim 1, wherein said second milling portion includes an orifice adapted to allow milling debris to exit the milling head recess, and wherein said bevel cutting blade is attached to a wall of the orifice.

3. A milling head according to claim 2, wherein said bevel cutting blade is disposed in a plane radial to the central rotational axis of the body.

4. A milling head for a rotary milling tool, comprising:
   a substantially cylindrical body having an annular recess, said body adapted to be connected to a rotary milling tool,
   a first milling portion, adapted to remove a portion of an outer diameter of a tube, located substantially at one end of the body and having one or more cutting blades connected a predetermined radial distance from a rotational axis of the body to the body by a securing element, wherein the securing element includes a head which extends out from a face surface of said blade a first distance which is less than 95% of a second distance measured from a lower edge of the securing element head to a lower cutting edge of the blade; and
   a second milling portion spaced from said first milling portion on the body and having at least one bevel cutting blade having an active cutting edge extending into the recess adapted for forming a bevel on the tube, wherein the bevel cutting blade active cutting edge is disposed at an angle of about 20° to about 60° in relation to the central rotational axis of the body.

5. A milling head according to claim 4, wherein the bevel cutting blade is triangular.

6. A milling head according to claim 5, wherein the bevel cutting blade has three cutting edges.

7. A milling head according to claim 1, wherein the bevel cutting blade active cutting edge is disposed at an angle of about 30° to about 45° in relation to the central rotational axis of the body, and wherein a lowermost cutting portion of the bevel cutting blade active cutting edge is located a distance of about 0.25 to about 1.50 inches from a lower cutting edge of the first milling portion cutting blade measured in relation along the central rotational axis.

8. A milling head according to claim 3, wherein said first milling portion blade cutting sweep is adapted to remove from about 2% to about 15% of said tube thickness, and wherein two or three bevel cutting blades with corresponding orifices are present on the milling head, and wherein said first distance is less than about 90% of said second distance.

9. A milling head according to claim 4, wherein said first milling portion blade cutting sweep is adapted to remove from about 2% to about 15% of said tube thickness.

10. A milling head for a rotary milling tool, comprising:
    a substantially cylindrical body having an annular recess, said body adapted to be connected to a rotary milling tool,
    a first milling portion, adapted to remove a portion of an outer diameter of a tube, located substantially at one end of the body and having one or more cutting blades connected a predetermined radial distance from a rotational axis of the body to the body by a securing element, wherein the securing element includes a head which extends out from a face surface of said blade a first distance which is less than or equal to a second distance measured from a lower edge of the securing element head to a lower cutting edge of the blade; and
    a second milling portion spaced from said first milling portion on the body and having at least one bevel cutting blade having an active cutting edge extending into the recess adapted for forming a bevel on the tube, wherein said first milling portion blade face surface has a bore extending therethrough through which said securing element connects said blade to said body, said blade having a countersink around said bore receiving at least a portion of a head of said securing element.

11. A milling head for a rotary milling tool, comprising:
    a substantially cylindrical body having an annular recess, said body adapted to be connected to a rotary milling tool at a first end portion,
    a first milling portion adapted to remove a portion of an outer diameter of a tube, the first milling portion located substantially at a second end portion of the body and having a blade support comprising a threaded bore, and a cutting blade having a bore which extends from a face surface to an opposite back surface of the cutting blade, wherein the cutting blade is connected to the blade support by a securing element having a threaded portion threadable in the blade support bore and a head portion, wherein the cutting blade has a lower cutting edge opposite the first end portion of the body, wherein the cutting blade is connected to the blade support at a predetermined radial distance from the rotational axis of the body, wherein the securing element head portion extends out from the face surface of said cutting blade a first distance which is less than or equal to a second distance measured from a lower edge of the securing element head to the lower cutting edge of the cutting blade, wherein said first milling portion culling blade has a countersink around said bore receiving at least a portion of a head of said securing element; and a second milling portion spaced from said first milling portion on the body and having at least one bevel cutting blade having an active cutting edge extending into the recess adapted for forming a bevel on the tube.

12. A milling head according to claim 11, wherein said second milling portion includes an orifice adapted to allow milling debris to exit the milling head recess, and wherein said bevel cutting blade is attached to a wall of the orifice.

13. A milling head according to claim 12, wherein said bevel cutting blade is disposed in a plane radial to the central rotational axis of the body.

14. A milling head according to claim 11, wherein the bevel cutting blade active cutting edge is disposed at an angle of about 20° to about 60° in relation to the central rotational axis of the body, wherein said first distance is less than about 95% of said second distance, and wherein said bevel blade is triangular in shape.

15. A milling head according to claim 11, wherein the bevel cutting blade is triangular.

16. A milling head according to claim 15, wherein the bevel cutting blade has three cutting edges.

17. A milling head according to claim 11, wherein the bevel cutting blade active cutting edge is disposed at an angle of about 30° to about 45° in relation to the central rotational axis of the body, and wherein a lowermost cutting portion of the bevel cutting blade active culling edge is located a distance of about 0.25 to about 1.50 inches from the lower cutting edge of the first milling portion cutting blade measured in relation along a central rotational axis of the milling head.

18. A milling head according to claim 11, the first portion cutting blade having one or more cutting edges including the lower cutting edge, said one or more cutting edges defining an annular cutting sweep having an inner radius and an outer radius wherein the outer radius is adapted to be greater than an outer diameter of the tube, wherein said cutting sweep is adapted to remove from about 2% to about 25% of said annular tube thickness and any weld overlay and membrane present on the tube within the annular cutting sweep, and wherein two or three bevel cutting blades with corresponding orifices are present on the milling head, and wherein said first distance is less than about 90% of said second distance.

19. A milling head for a rotary milling tool, comprising:
a substantially cylindrical body having an annular recess, said body adapted to be connected to a rotary milling tool at a first end portion,
a first milling portion adapted to remove a portion of an outer diameter of a tube, the first milling portion located substantially at a second end portion of the body and having a blade support comprising a threaded bore, and a cutting blade having a bore which extends from a face surface to an opposite back surface of the cutting blade, wherein the cutting blade is connected to the blade support by a securing element having a threaded portion threadable in the blade support bore and a head portion, wherein the cutting blade has a lower cutting edge opposite the first end portion of the body, wherein the cutting blade is connected to the blade support at a predetermined radial distance from the rotational axis of the body, wherein the securing element head portion extends out from the face surface of said cutting blade a first distance which is less than or equal to a second distance measured from a lower edge of the securing element head to the lower cutting edge of the cutting blade; and
a second milling portion spaced from said first milling portion on the body and having at least one bevel cutting blade having an active cutting edge extending into the recess adapted for forming a bevel on the tube, wherein the first portion cutting blade has one or more cutting edges including the lower cutting edge, said one or more cutting edges defining an annular cutting sweep having an inner radius and an outer radius wherein the outer radius is adapted to be greater than an outer diameter of the tube, wherein said cutting sweep is adapted to remove from about 2% to about 15% of said annular tube thickness and any weld overlay and membrane present on the tube within the annular cutting sweep.

20. A milling head according to claim 10, wherein the securing element connects the first portion blade to the body whereby the securing element head has an end that is flush mounted or recess mounted in relation to the blade face.

21. A milling head according to claim 11, wherein the securing element connects the first portion blade to the body whereby the securing element head has an end that is flush mounted or recess mounted in relation to the blade face.

22. A milling head according to claim 12, wherein said cutting blade has one or more cutting edges including the lower cutting edge, said one or more cutting edges defining an annular cutting sweep having an inner radius and an outer radius wherein the outer radius is adapted to be greater than an outer diameter of the tube, said cutting sweep adapted to remove from about 2% to about 25% of an outer radial thickness of the tube and any weld overlay and membrane present on the tube within the annular cutting sweep.

* * * * *

UNITED STATES PATENT AND TRADEMARK OFFICE
CERTIFICATE OF CORRECTION

| | |
|---|---|
| PATENT NO. | : 7,607,374 B2 |
| APPLICATION NO. | : 11/157624 |
| DATED | : October 27, 2009 |
| INVENTOR(S) | : Hall |

It is certified that error appears in the above-identified patent and that said Letters Patent is hereby corrected as shown below:

IN THE CLAIMS:

In Claim 11, column 15 line 15 please replace "culling" with --cutting--.

In Claim 17, column 15 line 43 please replace "cullling" with --cutting--.

Signed and Sealed this

Twenty-ninth Day of December, 2009

David J. Kappos
*Director of the United States Patent and Trademark Office*